(12) United States Patent
Neligan et al.

(10) Patent No.: US 12,434,587 B2
(45) Date of Patent: Oct. 7, 2025

(54) CHARGING STATION

(71) Applicant: Jolt Energy GmbH, Munich (DE)

(72) Inventors: Maurice Neligan, Munich (DE);
Markus Ostermeier, Munich (DE)

(73) Assignee: Jolt Energy GmbH, Munich (DE)

( * ) Notice: Subject to any disclaimer, the term of this patent is extended or adjusted under 35 U.S.C. 154(b) by 470 days.

(21) Appl. No.: 17/907,298

(22) PCT Filed: Mar. 30, 2021

(86) PCT No.: PCT/EP2021/058349
§ 371 (c)(1),
(2) Date: Sep. 26, 2022

(87) PCT Pub. No.: WO2021/198287
PCT Pub. Date: Oct. 7, 2021

(65) Prior Publication Data
US 2023/0110777 A1    Apr. 13, 2023

(30) Foreign Application Priority Data

Mar. 31, 2020 (EP) .................................. 20166977

(51) Int. Cl.
*H02J 7/00* (2006.01)
*B60L 53/14* (2019.01)
(Continued)

(52) U.S. Cl.
CPC .............. *B60L 53/62* (2019.02); *B60L 53/14* (2019.02); *B60L 53/18* (2019.02); *B60L 53/30* (2019.02); *B60L 53/66* (2019.02); *B60L 58/26* (2019.02); *B60L 58/27* (2019.02); *H01M 10/425* (2013.01); *H01M 10/443* (2013.01); *H01M 10/613* (2015.04); *H01M 10/625* (2015.04);
(Continued)

(58) Field of Classification Search
CPC .......... B60L 53/62; B60L 53/14; B60L 53/66; B60L 53/30; B60L 53/18; H01M 10/613; H01M 10/625; H01M 10/63; H01M 10/443; H01M 10/425
USPC ....................................................... 320/109
See application file for complete search history.

(56) References Cited

U.S. PATENT DOCUMENTS

2012/0043943 A1    2/2012  Dyer
2015/0306974 A1 * 10/2015  Mardall ............. H01M 10/625
                                                            429/120

(Continued)

OTHER PUBLICATIONS

EPO Communication for corresponding EP 21714237, mailed Mar. 12, 2024 (5 pages).

(Continued)

*Primary Examiner* — Alexis B Pacheco
(74) *Attorney, Agent, or Firm* — Maginot, Moore & Beck

(57) ABSTRACT

A charging station (1) for charging a vehicle battery (2A) of at least one electrically powered vehicle (2) connected to said charging station (1) by means of a pluggable charging connector (3) adapted to transfer in a charging process electrical power from said charging station (1) to the vehicle battery (2A), wherein a valve of said charging station (1) and/or of the vehicle (2) is opened before, during and/or after said charging process to supply a medium with a suitable temperature into a battery conditioning unit (2B) of the vehicle (2) to optimize the temperature of the vehicle battery (2A) for the charging process.

15 Claims, 2 Drawing Sheets

(51) Int. Cl.

| | |
|---|---|
| *B60L 53/18* | (2019.01) |
| *B60L 53/30* | (2019.01) |
| *B60L 53/62* | (2019.01) |
| *B60L 53/66* | (2019.01) |
| *B60L 58/26* | (2019.01) |
| *B60L 58/27* | (2019.01) |
| *H01M 10/42* | (2006.01) |
| *H01M 10/44* | (2006.01) |
| *H01M 10/613* | (2014.01) |
| *H01M 10/625* | (2014.01) |
| *H01M 10/63* | (2014.01) |
| *H02J 7/14* | (2006.01) |

(52) U.S. Cl.
CPC .... *H01M 10/63* (2015.04); *H01M 2010/4271* (2013.01); *H01M 2220/20* (2013.01)

(56) References Cited

U.S. PATENT DOCUMENTS

| | | | | |
|---|---|---|---|---|
| 2016/0059733 | A1* | 3/2016 | Hettrich | B60L 58/27 701/2 |
| 2016/0207416 | A1* | 7/2016 | Gauthier | G07C 5/085 |
| 2016/0207417 | A1* | 7/2016 | Gauthier | B60L 58/27 |
| 2017/0129359 | A1* | 5/2017 | Dunlap | B60L 53/14 |
| 2017/0297431 | A1* | 10/2017 | Epstein | F02N 19/10 |
| 2018/0304757 | A1 | 10/2018 | Vaughan | |
| 2018/0304765 | A1* | 10/2018 | Newman | B60L 58/26 |
| 2018/0339597 | A1 | 11/2018 | Kruszelnicki | |
| 2018/0339601 | A1 | 11/2018 | Kruszelnicki | |
| 2019/0157882 | A1* | 5/2019 | Sherback | H02J 7/0013 |
| 2019/0241093 | A1 | 8/2019 | Shimauchi et al. | |
| 2022/0185135 | A1* | 6/2022 | Langton | B60L 58/12 |
| 2022/0250506 | A1* | 8/2022 | Goldman-Shenhar | G01C 21/3469 |
| 2022/0281352 | A1* | 9/2022 | Duan | B60K 6/42 |
| 2023/0001824 | A1* | 1/2023 | Shaotran | H01M 10/633 |

OTHER PUBLICATIONS

International Search Report for corresponding PCT/EP2021/058349, mailed Jul. 12, 2021 (14 pages).

Atmaja, Dwi et al., Energy Storage System Using Battery and Ultracapacitor on Mobile Charging Station for Electric Vehicle, Energy Procedia, Elsevier NL, vol. 68, May 27, 2015, pp. 429-437, CP029611241.

Search Report for corresponding EP application No. 24193738.2, mailed Mar. 26, 2025 (11 pages).

Atmaja, Tinton et al., Energy Storage System Using Battery and Ultracapacitor on Mobile Charging Station for Electric Vehicle, Energy Procedia, Elsevier, May 27, 2015, pp. 429-437, vol. 68, XP029611241 (9 pages).

\* cited by examiner

CHARGING STATION

PRIORITY CLAIM

This application is a U.S. national stage of PCT/EP2021/058349, filed on Mar. 30, 2021, which claims priority to EP application 2016697.7, filed on Mar. 31, 2020, the entire disclosures of which are incorporated herein by reference.

BACKGROUND

The invention relates to a charging station for charging a vehicle battery of at least one electrically powered vehicle and to a method for charging a vehicle battery of at least one electrically powered vehicle connected to the charging station.

Electromobility becomes increasingly important as more and more vehicles are electrically powered. As the number of electrically powered vehicles increases, there is an increasing need to charge vehicle batteries efficiently. Further, the electrical capacity of vehicle batteries becomes larger so that the vehicle batteries have to be charged with more electrical power to avoid long charging periods. However, if vehicle batteries of electrical vehicles have to be charged with higher electrical power, the temperature of the vehicle batteries increases during the charging process. Vehicle batteries may reach a temperature level which requires cooling of the vehicle batteries. In some use cases, the charging is performed with an electrical power of up to and more than 1,000 kW. This high power charging generates heat causing a temperature increase. The increase of the temperature during the charging process with high electrical power can be even higher depending on the ambient temperature. Accordingly, the ambient temperature may also have an impact on the temperature of the vehicle battery to be charged by the charging station. For instance, during the winter period, it may be required to warm up the vehicle battery so that the charging process can be performed more efficiently.

SUMMARY OF THE DISCLOSURE

Accordingly, it is the object of the present invention to provide a charging station and corresponding charging method which allows to charge an electrical battery of a vehicle efficiently for different charging powers and/or ambient temperatures.

The invention provides according to a first aspect a charging station for charging a vehicle battery of at least one electrically powered vehicle connected to the charging station by means of a pluggable charging connector adapted to transfer in a charging process electrical power from said charging station to the vehicle battery, wherein a valve of said charging station and/or of the vehicle is opened before, during and/or after said charging process to supply a medium with a suitable temperature into a battery conditioning unit of the vehicle to optimize the temperature of the vehicle battery for the charging process.

In a possible embodiment, the supplied medium comprises a fluid.

In a possible embodiment of the charging station according to the first aspect of the present invention, the battery conditioning unit of the connected vehicle receiving the medium through the at least one opened valve from the charging station is adapted to optimize the temperature of the vehicle battery before, while and/or after the electrical charging process of the vehicle battery.

In a preferred embodiment, the charging station according to the first aspect of the present invention comprises a transportable charging station with at least one integrated battery pack adapted to store electrical power transferred at least partially during the electrical charging process via a cable and the plugged-in charging connector into the vehicle battery of the least one electrically powered vehicle connected to said transportable charging station by means of said cable.

The transportable charging station can for instance be transported in an urban environment by means of a transport truck having a crane adapted to lift the charging station for recharging at a central recharging facility. In this embodiment, the charging station is not connected to a power supply network but is transported to another location for recharging by the central recharging facility.

In a further possible embodiment of the charging station according to the first aspect of the present invention, the charging station comprises a medium temperature adjustment unit adapted to adjust the medium temperature of the medium to the suitable temperature before supplying the medium via the opened valve of the charging station and/or of the vehicle to the battery conditioning unit of the vehicle.

In a possible embodiment, the battery temperature of the vehicle battery is determined by a temperature determination unit of the vehicle and notified to the charging controller of the charging station provided to control the medium temperature adjustment unit of the charging station.

In a possible embodiment of the charging station according to the first aspect of the present invention, the medium temperature adjustment unit of the charging station is connected to the battery conditioning unit of the vehicle by means of a medium feedline provided to feed the medium with the suitable temperature into the battery conditioning unit and by means of a medium feedback line provided to feedback the medium back to the medium temperature adjustment unit of the charging station.

In a further possible embodiment of the charging station according to the first aspect of the present invention, at least one controllable valve is provided in the medium feedline and/or in the medium feedback line.

In a further possible embodiment of the charging station according to the first aspect of the present invention, the at least one controllable valve is controlled by the charging controller of the charging station.

In a further possible embodiment of the charging station according to the first aspect of the present invention, the at least one controllable valve is integrated in the pluggable charging connector and can be opened or closed in response to a valve control signal received from the charging controller of the charging station.

In a further possible embodiment of the charging station according to the first aspect of the present invention, the medium supplied by the medium temperature adjustment unit of the charging station is further used to heat or cool a cabin of the vehicle during the charging process.

In a further possible embodiment of the charging station according to the first aspect of the present invention, a plug-in of the pluggable charging connector of the charging station into a corresponding socket of the vehicle is detected by a plug-in detection unit of the vehicle and/or a plug-in detection unit of the charging station and is notified to the charging controller of the charging station.

In a possible embodiment of the charging station according to the first aspect of the present invention, the controllable valve of the charging station and/or the controllable valve of the vehicle is opened automatically if a plug-in of the pluggable charging connector into the socket of the vehicle is detected by the plug-in detection unit of the vehicle and/or by the plug-in detection unit of the charging station.

In a further possible embodiment of the charging station according to the first aspect of the present invention, the battery conditioning unit of the vehicle comprises a heat exchanging device adapted to exchange heat between the medium supplied by the charging station and a battery cooling circuit of the vehicle.

In a further possible embodiment of the charging station according to the first aspect of the present invention, the charging station comprises a first communication interface for providing communication between the charging controller of the charging station and a battery management unit of the vehicle via the plug-in charging connector of the charging station.

In a further possible embodiment of the charging station according to the first aspect of the present invention, the charging station comprises a second communication interface for providing communication between the charging controller of the charging station and the battery management unit of a remote vehicle approaching this charging station.

In a further possible embodiment of the charging station according to the first aspect of the present invention, the vehicle battery is charged during the charging process via the cable with a power of more than 100 kW.

The invention further provides according to a further aspect a method for charging a vehicle battery of at least one electrically powered vehicle.

The invention provides according to the second aspect a method for charging a vehicle battery of at least one electrically powered vehicle connected to the charging station by means of a pluggable charging connector which transfers in a charging process electrical power from the charging station to the vehicle battery, wherein a valve of the charging station and/or a valve of the vehicle is opened before, during and/or after said charging process to supply a medium with a suitable temperature into a battery conditioning unit of the vehicle to optimize the temperature of the vehicle battery for the charging process.

DESCRIPTION OF THE DRAWINGS

In the following, possible embodiments of the different aspects of the present invention are described in more detail with reference to the enclosed figures.

DETAILED DESCRIPTION

Figure 1:
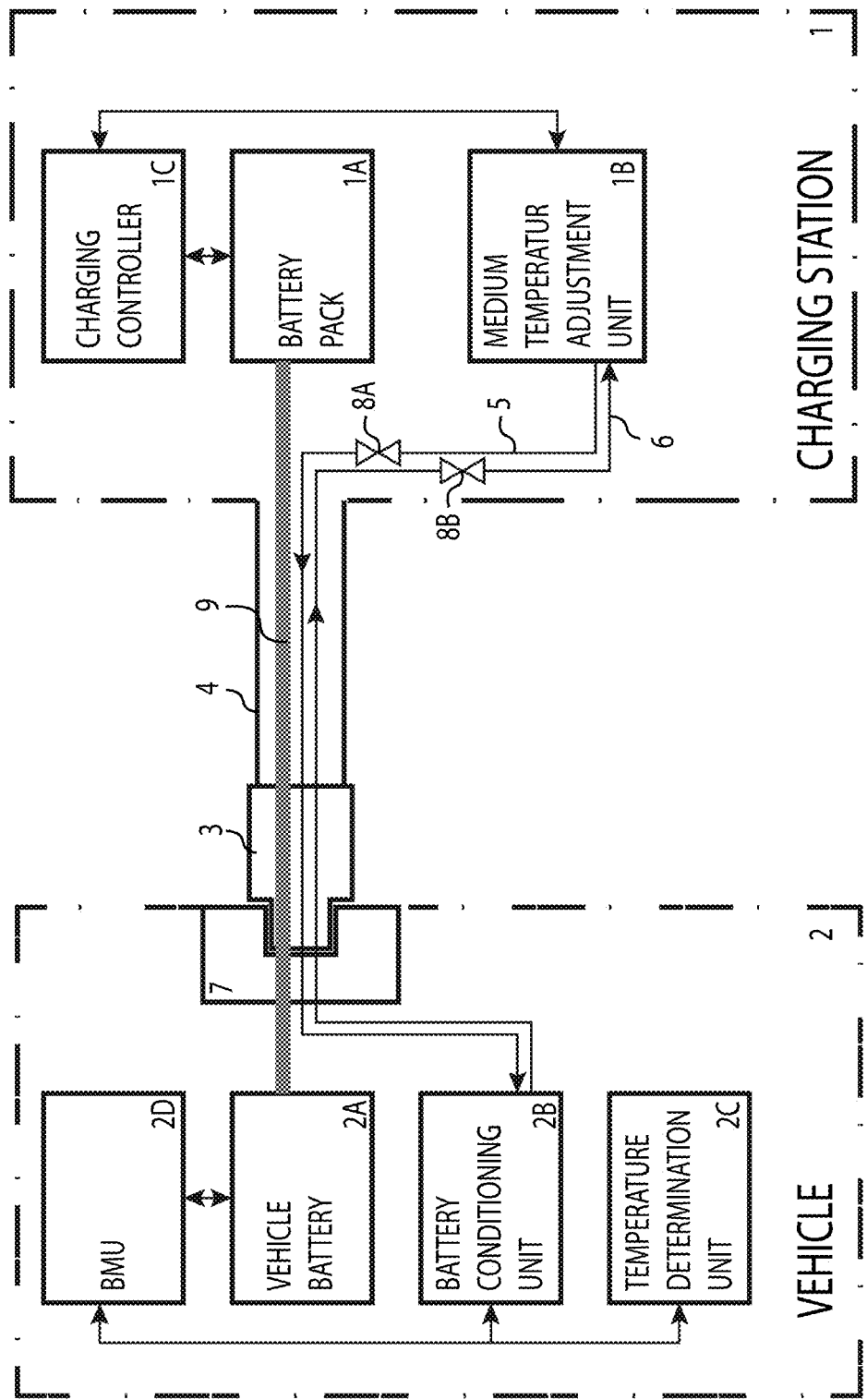
FIG. 1 shows a block diagram for illustrating a possible exemplary embodiment of a charging station according to the first aspect of the present invention.

As can be seen in the block diagram of FIG. 1, a charging station 1 according to the first aspect of the present invention can be used for charging at least one vehicle battery 2A of an electrically powered vehicle 2 connected to the charging station 1. The charging station 1 can be used to load vehicle batteries 2A of several electrically powered vehicles 2 connected to the charging station 1 at the same time. The charging station 1 can be used to charge vehicle batteries 2A of different kinds of electrically powered vehicles 2 including electrically powered cars or trucks but also smaller devices such as electrically powered bicycles. In the illustrated embodiment of FIG. 1, the electrically powered vehicle 2 can be connected to the charging station 1 by means of a pluggable charging connector 3 plugged into a corresponding socket 7 of the vehicle 2. The charging connector 3 is adapted to transfer in a charging process electrical power from the charging station 1 into the vehicle battery 2A of the vehicle 2. A valve of the charging station 1 and/or a valve of the vehicle 2 is opened before, during and/or after the charging process to supply a medium M with a suitable temperature into a battery conditioning unit 2B of the vehicle 2 to optimize the temperature of the vehicle battery 2A for the respective charging process. The supplied medium M can comprise a fluid with a high heat capacity.

The battery conditioning unit 2B of the vehicle 2 receives the medium M through the at least one opened valve from the charging station 1 and is adapted to optimize the temperature of the vehicle battery 2A before, while and/or after the electrical charging process of the vehicle battery 2A. In a preferred embodiment, the charging station 1 is a transportable charging station with at least one integrated battery pack 1A as shown in FIG. 1. The integrated battery pack 1A is adapted to store electrical power which can be transferred at least partially during the electrical charging process via a power line 9 within a cable 4 and the plugged-in charging connector 3 to the vehicle battery 2A of the electrically powered vehicle 2 connected to the transportable charging station 1 by means of the cable 4. In the illustrated embodiment of FIG. 1, the charging station 1 is a transportable charging station which is not connected to a public power supply grid. The charging station 1 can be integrated in a housing which is liftable by a crane of a transport truck. The crane of the transport truck can lift the housing of the charging station 1 to a transport platform of a truck which transports the charging station 1 to a central recharging facility adapted to recharge the at least one battery pack 1A of the charging station 1 depleted by the charging processes performed to charge the vehicle batteries 2A. After recharging of the battery pack 1A at the central recharging facility, the transportable charging station 1 can be transported back by the transport truck to a desired location and deployed in the field by lifting the housing of the charging station 1 with the crane to the ground floor. Consequently, the transportable charging station 1 shown in FIG. 1 can be easily relocated to other locations to provide a local possibility for recharging vehicle batteries 2A.

The charging station 1 comprises a medium temperature adjustment unit 1B which can adjust the medium temperature of the medium M such as a fluid to the suitable temperature before supplying the medium M via the at least one opened valve of the charging station 1 and/or of the vehicle 2 to the battery conditioning unit 2B of the vehicle 2. The medium temperature of the medium M can be adjusted by the medium temperature adjustment unit 1B depending on a battery temperature of the vehicle battery 2A of the vehicle 2. This adjustment can also take place before the vehicle battery 2A of the vehicle 2 is connected to the charging station 1 via the cable 4, e.g. for a vehicle 2 approaching the charging station 1. In this scenario, the current battery temperature of the vehicle battery 2A may be notified to a charging controller 1C of the charging station 1, for instance via a wireless communication link. The charging controller 1C can control the medium temperature adjustment unit 1B to adapt the temperature of the medium M in advance before the vehicle 2 arrives at the charging station 1 so that the medium M with the suitable temperature is already available when the vehicle 2 is connected to the charging station 1 via the cable 4. In this way, the required time for recharging the vehicle battery 2A can be reduced. In an alternative embodiment, the medium temperature adjustment unit 1B adapts the temperature of the medium M after the vehicle 2 has been connected to the charging station 1. In a possible embodiment, the battery temperature of the vehicle battery 2A is determined by a temperature determination unit 2C of the vehicle 2 as illustrated in the block diagram of FIG. 1. The determined battery temperature can be notified by the temperature determination unit 2C of the vehicle 2 to the charging controller 1C of the charging station 1 which uses the received information about the battery temperature to control the medium temperature adjustment unit 1B of the charging station 1. As illustrated in FIG. 1, the charging controller 1C and the medium temperature adjustment unit 1B can be connected to each other by means of an integrated control and data bus. The temperature determination unit 2C can comprise at least one temperature sensor adapted to measure the current temperature of the vehicle battery 2A and notify the temperature of the vehicle battery 2A to an integrated battery management unit 2D of the vehicle 2 as also illustrated in FIG. 1. The temperature determination unit 2C and the battery management unit 2D can also be connected by means of an integrated control and data bus allowing communication. The battery conditioning unit 2B is connected via the control and data bus to the battery management unit 2D of the vehicle 2. The temperature measured by the sensor of the temperature determination unit 2C notified to the battery management unit 2D of the vehicle 2 can be communicated to the charging controller 1C via a wireless communication link and/or via a communication line extending through the charging cable 4. The temperature data can also be supplied via a wireless network such as a mobile telephone network used to forward the temperature data from the battery management unit 2D to a transceiver integrated in the charging station 1 supplying the received information to the charging controller 1C. Accordingly, there can be a wireless communication link between the battery management unit 2D and the charging controller 1C adapted to provide bidirectional communication for exchanging data and/or information.

In the illustrated embodiment of FIG. 1, the medium temperature adjustment unit 1B of the charging station 1 is connected to the battery conditioning unit 2B of the vehicle 2 by means of a medium feedline 5 provided to feed the medium M with the suitable temperature T into the battery conditioning unit 2B. Further, a medium feedback line 6 is provided to feedback the medium back to the medium temperature adjustment unit 1B of the charging station 1. Accordingly, in the illustrated embodiment, the medium temperature adjustment unit 1B and the battery conditioning unit 2B form a closed loop in which the medium M can circulate if the controllable valves are opened.

In the illustrated embodiment of FIG. 1, the cable 4 comprises a power supply line 9 through which electrical power can be transferred from the battery pack 1A to the vehicle battery 2A connected to the charging station 1. The cable 4 also includes the feedline 5 as well as the feedback line 6 used for circulating the medium M. In the illustrated embodiment of FIG. 1, a controllable valve 8A is provided in the feedline 5 and another controllable valve 8B is provided in the feedback line 6. Both controllable valves 8A, 8B can be controlled by the charging controller 1C of the charging station 1. If the valves 8A, 8B are opened, a medium M can be supplied with the suitable temperature T to the battery conditioning unit 2B of the vehicle 2 to optimize the temperature of the vehicle battery 2A for the charging process. The different valves 8A, 8B can be opened and closed either simultaneously (i.e. in parallel) or in a predefined order. For instance it is possible to open first valve 8A and to pump the medium into the battery conditioning unit 2B of the vehicle 2 before closing the valve 8A after a predetermined waiting period. After having closed valve 8A the other valve 8B can be opened to pump the medium back to the medium adjustment unit 1B of the charging station 1. This serial process can be executed at a high rate. The charging station 1 can comprise integrated pumps providing sufficient pressure for transporting the medium M from the medium temperature adjustment unit 1B to the battery conditioning unit 2B via the feedline 5 and back via the feedback line 6.

In the illustrated embodiment of FIG. 1, the controllable valves 8A, 8B are integrated in the charging station 1. In an alternative embodiment, at least one controllable valve can be integrated in the pluggable charging connector 3 to open and close in response to a valve control signal CRTL received from the charging controller 1C of the charging station 1 via a control signal line. In a still further possible alternative embodiment, at least one controllable valve can also be integrated in the socket 7 of the vehicle 2. The medium M supplied by the medium temperature adjustment unit 1B of the charging station 1 can be used in a further possible implementation also to heat and/or cool a cabin of the vehicle 2 during the charging process.

In a possible embodiment, a plug-in of the pluggable charging connector 3 of the charging station 1 into the corresponding socket 7 of the vehicle 2 can be detected by a plug-in detection unit of the vehicle 2 and/or by a plug-in detection unit of the charging station 1. The detected plug-in can be notified to the charging controller 1C of the charging station 1 and/or to the battery management unit 2D of the vehicle 2. In a possible implementation, at least one controllable valve such as the controllable valves 8A, 8B shown in FIG. 1 are opened automatically if a plug-in of the pluggable charging connector 3 into the socket 7 of the vehicle 2 has been detected by the plug-in detection unit of the charging station 1 and/or by the plug-in detection unit of the vehicle 2.

The battery conditioning unit 2B of the vehicle 2 comprises in a preferred embodiment a heat exchanging device adapted to exchange heat between the medium M supplied by the charging station 1 and a battery cooling circuit of the vehicle 2. In this embodiment, the vehicle 2 comprises two separate cooling circuits connected by means of the heat exchanging device integrated in the chassis of the vehicle 2. In an alternative embodiment, the connected electrical vehicle 2 comprises only one cooling circuit to which the medium temperature adjustment unit 1B is connected via the feedline 5 and feedback line 6. In this embodiment, the vehicle battery 2A can be cooled during the charging process and no separate cooling device is required for the vehicle 2.

In a possible embodiment of the charging station 1, the charging station 1 comprises a first communication interface which allows communication between the charging controller 1C of the charging station 1 and the battery management unit 2D of the vehicle 2 via the plugged-in charging connector 3 of the charging station 1. In a still further possible embodiment of the charging station 1, the charging station 1 comprises a second communication interface for providing communication between the charging controller 1C of the charging station 1 and the battery management unit 2D of the vehicle 2. The second communication interface can comprise a wireless communication interface which allows communication between the charging controller 1C and the battery management unit 2D of a remote vehicle approaching the charging station 1 for an intended charging process of its vehicle battery 2A. The charging power provided by the charging station 1 can vary depending on the use case. In a possible embodiment, the vehicle battery 2A of the vehicle 2 is charged during the charging process via a powerline 9 of the charging cable 4 with a power of more than 100 kW.

Figure 2:
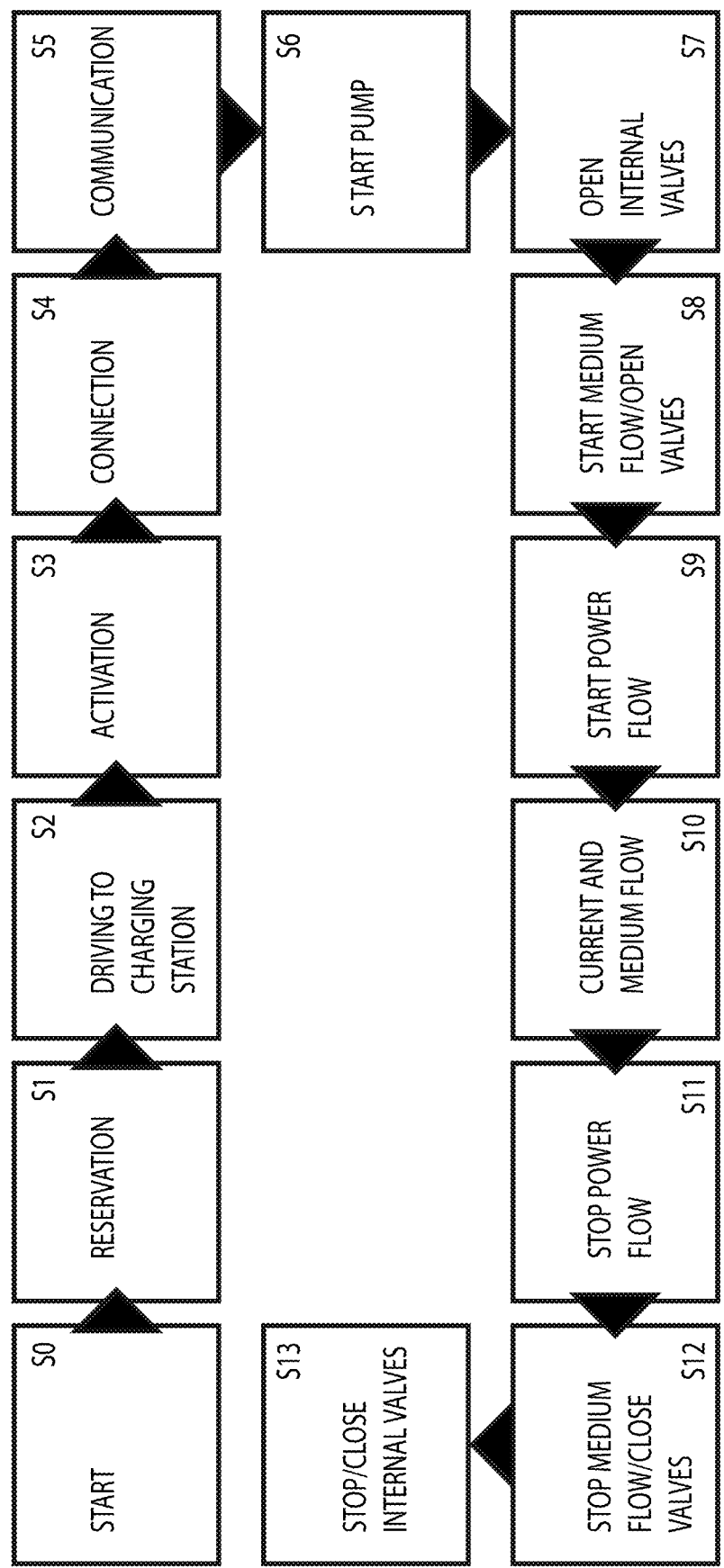
FIG. 2 shows a flowchart of steps to be performed for loading a vehicle battery using a charging station according to the present invention.

FIG. 2 illustrates the operation of a charging station 1 according to the present invention. In the illustrated exemplary flow, a driver or user of an electrically powered vehicle intends in step S0 to recharge the vehicle battery 2A of his vehicle 2 and initiates the process.

In a possible implementation, the charging station 1 can be displayed by a navigation system of the vehicle 2 to the user of the vehicle 2. The driver or user of the vehicle 2 can make in step S1 a reservation for a future intended charging process at the charging station 1. A reservation message is transferred from the battery management unit 2D of the vehicle 2 via a wireless communication link to the charging controller 1C of the charging station 1. In the reservation message, a time slot for the intended charging process can be reserved for the respective vehicle 2. In a possible embodiment, the reservation message can include additional information about the vehicle battery 2A, i.e. its battery capacity. Further, the current battery temperature as measured by the temperature determination unit 2C can be transmitted to the charging controller 1C. Other information can be transmitted as well e.g. an indication of a desired medium temperature for the intended charging process. The charging controller 1C of the charging station 1 can process the received message and reserve a corresponding time slot TS for the future charging process of the approaching vehicle 2. The required time period can be calculated on the basis of the received information and a time slot TS can be reserved by the controller 1C. In a possible implementation, the charging controller 1C can control the medium temperature adjustment unit 1B to warm or cool the medium M to a suitable temperature depending on the information received from the battery management unit 2D and/or other parameters such as the chemical composition of the medium M and/or the current ambient temperature. The medium temperature adjustment unit 1B can comprise in a possible implementation a reservoir or tank filled with a predefined volume of the medium M which can be heated and/or cooled in response to a control signal of the charging controller 1C so that a suitable medium temperature can be achieved, even before the vehicle 2 arrives at the charging station 1.

In step S2, the vehicle 2 is driven to the charging station 1 and a charging lid might be opened by the user.

In a further step S3, the charging station 1 may be activated, for instance if a plug-in of the pluggable connector 3 into the socket 7 of the vehicle 2 has been detected by the plug-in detection unit. As soon as the charging station 1 has been activated, additional processes can be triggered such as an authentication of the user of the vehicle 2 and/or of the vehicle 2 itself. Further, a payment procedure can be initiated in response to the detected plug-in in step S3. In an alternative embodiment, the activation of the charging station 1 can be performed before the vehicle 2 reaches the location of the charging station 1. The navigation system of the vehicle 2 can determine the momentary location of the driving vehicle 2 and may signal the imminent arrival of the vehicle 2 to the charging controller 1C, for example if the vehicle 2 is within a predefined range of the charging station 1.

In a further step S4, the electrical connection between the battery pack 1A of the charging station 1 and the vehicle battery 2A via the powerline 9 integrated in the cable 4 is established.

In a further step S5, communication between the battery management unit 2D and the charging controller 1C can be performed via the first and/or second communication interface or via a powerline communication PLC along the power signal line 9. For instance, the controller 1C may recognize the type of the vehicle 2, in particular whether it comprises a separate battery cooling circuit or not.

In a further step S6, the controller 1C can activate a pumping device adapted to pump the medium M from the medium temperature adjustment unit 1B via the feedline 5 to the battery conditioning unit 2B of the vehicle 2 and back via the feedback line 6 to the medium temperature adjustment unit 1B. In a possible embodiment, the pumping rate of the pump can be adjusted depending on the electrical power rate used in the charging process.

In step S7, the medium M starts to flow from the charging station 1 via the feedline 5 of the cable 4 to the battery conditioning unit 2B of the vehicle 2. To this end internal valves integrated in the charging station 1 may be opened in step S7. The battery conditioning unit 2B may comprise a heat exchanging device adapted to exchange heat between the received medium M and a separate battery cooling circuit of the vehicle 2.

When the fluid pump is started, the charging controller 1C can further control in step S8 to open other controllable valves in the medium transport loop, in particular in connector 3 the socket 7 or integrated in the vehicle 2. The number of controllable valves may differ for different use cases. Further, the valves can be either provided in the charging station 1 as illustrated in FIG. 1 or in an alternative embodiment, also in the vehicle 2. In a possible embodiment, at least one controllable valve is provided in the pluggable charging connector 3 and/or in the socket 7. The valve can be controlled by the charging controller 1C, for instance via a powerline communication through the powerline 9 of the cable 4 so that a control signal travels via the powerline 9 to the controllable valve integrated in the plug-in connector 3 of the cable 4.

At the same time, electrical power can start to flow from the battery pack 1A via the powerline 9 to the vehicle battery 2A in step S9. In a possible embodiment, the charging controller 1C can control an electromechanical or electronic switch to connect the battery pack 1A with the vehicle battery 2A in step S9. Depending on the location of the electronic switch or electromechanical relay, a control signal can also travel in a possible implementation through the powerline 9 using a powerline communication PLC. Since the medium M flows in parallel to the powerline 9 through the cable it does also cool the powerline 9 during the charging process.

Accordingly, in a possible embodiment, in step S10, the electrical current I used for charging the vehicle battery 2A and the medium M with the suitable temperature T are transported in parallel through the cable 4. The temperature of the medium M flowing through the feedline 5 and the medium M transported back via the feedback line 6 can be measured continuously and notified to the charging controller 1C and/or to the battery management unit 2D of the vehicle 2. Additional temperature sensors may be provided in the plug-in connector 3, the socket 7 and/or along the cable 4.

In a further step S11, the charging process is stopped. After the electrical charging process has been stopped, the stream of the medium M can be maintained for a predefined time period to provide the required cooling and/or heating of the vehicle battery 2A.

In a further step S12, the medium stream is stopped by closing the at least one controllable valve in response to a control signal provided by the charging controller 1C of the charging station 1. After the medium flow has been interrupted in step S12, the user of the vehicle 2 may disconnect the charging connector 3 from the socket 7 of the vehicle 2 in step S13. This can trigger a closing of the internal valves integrated in the housing of the charging station 1.

By providing the medium M with a suitable temperature, the charging process of the vehicle battery 2A can be optimized, since the charging performance is increased. The suitable temperature allows for faster loading of the vehicle battery 2A and also increases the operation lifetime of the vehicle battery. The supply of a medium M with a suitable temperature also increases the safety of the process since inadmissible temperature ranges of the vehicle battery 2A are avoided. Consequently, the charging process can be performed faster and in a more reliable manner. The adjustment of the medium temperature by the medium temperature adjustment unit 1B can be performed depending on the capacity of the vehicle battery 2A and the required amount of electrical energy to be transferred to the vehicle battery 2A. Further, the temperature of the supplied medium M can be adjusted depending on the required charging rate and/or available charging time.

In a possible embodiment, the charging controller 1C can be connected via a communication link to a remote central server providing cloud services to the charging station 1.

Depending on the use case, different kinds of media M can be used, for instance different kinds of fluids and/or gases. Also, different kinds of controllable valves can be used depending on the application or use case.

The fast charging method according to the present invention can be performed in the background so that a client or user may not even become aware of the fast charging method. In an alternative embodiment the fast charging is notified to the user. Also the charging time saved by temperature adjustment can be calculated by a processor of the charging controller 1C and notified to the user.

The invention claimed is:

1. A charging station for charging a vehicle battery of at least one electrically powered vehicle connected to said charging station by means of a pluggable charging connector adapted to transfer in a charging process electrical power from said charging station to the vehicle battery, wherein the charging station comprises:
   a charging controller,
   a medium temperature adjustment unit,
   the pluggable charging connector and a charging cable, wherein the charging cable includes a medium feedline, and
   at least one controllable valve, wherein the controllable valve is provided in the charging cable or is integrated in the pluggable charging connector, wherein the at least one controllable valve (8A) is controlled by the charging controller (1C),
   wherein the controllable valve of said charging station is openable before, during and/or after said charging process to supply a medium with a suitable temperature into a battery conditioning unit of the vehicle to optimize the temperature of the vehicle battery for the charging process,
   wherein the medium temperature adjustment unit is adapted to adjust the medium temperature of the medium to the suitable temperature before supplying the medium via the opened controllable valve of the charging station to the battery conditioning unit of the vehicle,
   wherein the charging station includes a first communication interface for providing communication between the charging controller of the charging station and a battery management unit of the vehicle via the plugged-in charging connector of the charging station and a wireless second communication interface for providing wireless communication between the charging controller of the charging station and a battery management unit of a remote vehicle approaching the charging station, and
   wherein the charging controller of the charging station is adapted to receive a wireless transferred reservation message from the battery management unit of the approaching vehicle, for processing the received reservation message and reserving a corresponding time slot for the future charging process of the approaching vehicle, wherein the charging controller is adapted to control the medium temperature adjustment unit of the charging station to adapt the temperature of the medium in advance before the approaching vehicle arrives at the charging station so that the medium with the suitable temperature is already available when the vehicle is connected to the charging station via the charging cable.

2. The charging station according to claim 1, wherein the battery conditioning unit of the vehicle receiving the medium through the opened valve from the charging station is adapted to optimize the temperature of the vehicle battery before, while and/or after the electrical charging process of the vehicle battery.

3. The charging station according to claim 1, comprising a transportable charging station with at least one integrated battery pack adapted to store electrical power transferred at least partially during the electrical charging process via the charging cable and the plugged-in charging connector into the vehicle battery of the least one electrically powered vehicle connected to said transportable charging station by means of said charging cable.

4. The charging station according to claim 1, wherein the medium temperature of the medium is adjusted by said medium temperature adjustment unit depending on a battery temperature of the vehicle battery of the vehicle connected or to be connected to said charging station.

5. The charging station according to claim 4, wherein the battery temperature of the vehicle battery (2A) is determined by a temperature determination unit (2C) of the vehicle (2) and notified to the charging controller (1C) of the charging station (1) provided to control the medium temperature adjustment unit (1B) of the charging station (1).

6. The charging station according to claim 1, wherein the medium temperature adjustment unit of the charging station is connected to the battery conditioning unit of the vehicle by means of the medium feedline of the charging cable provided to feed the medium with the suitable temperature into the battery conditioning unit and by means of a medium feedback line of the charging cable provided to feedback the medium back to the medium temperature adjustment unit of the charging station.

7. The charging station according to claim 6, wherein at least one controllable valve is provided in the medium feedline and/or in the medium feedback line.

8. The charging station according to claim 1, wherein the at least one controllable valve is integrated in the pluggable charging connector and is opened or closed in response to a valve control signal received from the charging controller of the charging station.

9. The charging station according to claim 1, wherein the medium supplied by the medium temperature adjustment unit of the charging station is further used to heat or cool a cabin of the vehicle during the charging process.

10. A system having a charging station used for charging a vehicle battery of at least one electrically powered vehicle connected to said charging station by means of a pluggable charging connector adapted to transfer in a charging process electrical power from said charging station to the vehicle battery, wherein the charging station of the system comprises:
 a charging controller,
 a medium temperature adjustment unit, and
 a pluggable charging connector and a charging cable, wherein the charging cable includes a medium feedline, and
 at least one controllable valve, wherein the controllable valve is provided in the charging cable or is integrated in the pluggable charging connector,
 wherein the at least one controllable valve is controlled by the charging controller, wherein the controllable valve of said charging station is openable before, during and/or after said charging process to supply a medium with a suitable temperature into a battery conditioning unit of the vehicle to optimize the temperature of the vehicle battery for the charging process,
 wherein the medium temperature adjustment unit is adapted to adjust the medium temperature of the medium to the suitable temperature before supplying the medium via the opened controllable valve of the charging station to the battery conditioning unit of the vehicle,
 wherein the charging station of the system comprises a first communication interface for providing communication between the charging controller of the charging station and a battery management unit of the vehicle via the plugged-in charging connector of the charging station and a second wireless communication interface for providing communication between the charging controller of the charging station and a battery management unit of a remote vehicle approaching the charging station, and
 wherein the charging controller is adapted to receive a wireless transferred reservation message from the battery management unit of the approaching vehicle, for processing the received message and reserving a corresponding time slot for the future charging process of the approaching vehicle, wherein the charging controller is adapted to control the medium temperature adjustment unit to adapt the temperature of the medium in advance before the approaching vehicle arrives at the charging station of the system so that the medium with the suitable temperature is already available when the vehicle is connected to the charging station via the charging cable,
 said system further comprising at least one electrically powered vehicle comprising a vehicle battery to be charged by the charging station of the system, wherein the electrically powered vehicle comprises a socket into which the pluggable charging connector of the charging station is pluggable,
 wherein the electrically powered vehicle further comprises a battery conditioning unit,
 wherein the medium temperature adjustment unit of the charging station is connectable to the battery conditioning unit of the vehicle by means of a medium feedline provided to feed the medium with a suitable temperature into the battery conditioning unit and by means of a medium feedback line provided to feedback the medium back to the medium temperature adjustment unit of the charging station.

11. The system according to claim 10, wherein the battery conditioning unit of the vehicle comprises a heat exchanging device adapted to exchange heat between the medium supplied by the charging station and a battery cooling circuit of the vehicle.

12. The system according to claim 10, wherein the vehicle battery is chargeable during the charging process via the charging cable with a power of more than 100 kW.

13. A method for charging a vehicle battery of at least one electrically powered vehicle connected to the charging station by means of a pluggable charging connector of a charging station, wherein the method comprises the steps of:
 receiving a reservation message transferred from the battery management unit of an approaching vehicle via a wireless communication link to a charging controller of the charging station,
 activating of the charging station,
 communicating between the battery management unit of the approaching vehicle and the charging controller of the charging station, wherein the charging controller of the charging station processes the received reservation message and reserves a corresponding time slot for the future charging process of the approaching vehicle, wherein the charging controller of the charging station controls the medium temperature adjustment unit of the charging station to adapt the temperature of the medium in advance before said approaching vehicle (2) arrives at the charging station (1) so that the medium (M) with the suitable temperature is already available when said approaching vehicle after its arrival at the charging station is connected to the charging station via a charging cable
and
 transferring in a charging process electrical power via the charging cable from said charging station to the vehicle battery,
 wherein a valve of said charging station is opened before, during and/or after said charging process to supply the medium with the suitable temperature into a battery conditioning unit of the vehicle to optimize the temperature of the vehicle battery for the charging process.

14. The method according to claim 13, further comprising:
 detecting a plug-in of the pluggable charging connector of the charging station into a corresponding socket of the vehicle by a plug-in detection unit of the charging station and notifying the detected plug-in to the charging controller of the charging station.

15. The method according to claim 14, further comprising:
 detecting a plug-in of the pluggable charging connector into the socket of the vehicle by the plug-in detection unit and opening the controllable valve of the charging station automatically if a plug-in of the pluggable charging connector into the socket of the vehicle is detected.

* * * * *